(12) United States Patent
Herrera Gutierrez et al.

(10) Patent No.: US 10,183,615 B2
(45) Date of Patent: Jan. 22, 2019

(54) INDICATOR LIGHT TO CORRECTLY POSITION JACK UNDER VEHICLE IN AN UNLIGHTED ENVIRONMENT

(71) Applicant: Ford Global Technologies, LLC, Dearborn, MI (US)

(72) Inventors: Michelle Carolina Herrera Gutierrez, Mexico City (MX); Nicole Pamela Herrera Gutierrez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/617,791

(22) Filed: Jun. 8, 2017

(65) Prior Publication Data
US 2018/0354410 A1    Dec. 13, 2018

(51) Int. Cl.
| G08B 21/00 | (2006.01) |
| B60C 23/02 | (2006.01) |
| B60C 23/06 | (2006.01) |
| B60Q 1/26  | (2006.01) |
| B62D 25/20 | (2006.01) |

(52) U.S. Cl.
CPC .......... B60Q 1/2619 (2013.01); B60C 23/02 (2013.01); B60Q 1/2696 (2013.01); B62D 25/2081 (2013.01)

(58) Field of Classification Search
CPC .................. B60C 23/007; B60C 23/0408
See application file for complete search history.

(56) References Cited

U.S. PATENT DOCUMENTS

| 3,746,069 | A |   | 7/1973  | Blomgren, Sr. et al. |
| 5,135,201 | A | * | 8/1992  | Engel ........................ B66F 3/12 |
|           |   |   |         |                            254/126 |
| 5,573,686 | A |   | 11/1996 | Lavicska |
| 6,323,762 | B1|   | 11/2001 | Ekpo, Jr. |
| 8,480,272 | B2|   | 7/2013  | Day |
| 9,283,819 | B2| * | 3/2016  | Salter ...................... B60C 23/02 |
| 2007/0013537 | A1 | | 1/2007 | Jones et al. |
| 2007/0274087 | A1 | | 11/2007 | Herold |

(Continued)

FOREIGN PATENT DOCUMENTS

| CN | 203627655 U | 6/2014 |
| CN | 105628292 A | 1/2016 |

(Continued)

*Primary Examiner* — Nimeshkumar Patel
*Assistant Examiner* — Jacob R Stern
(74) *Attorney, Agent, or Firm* — LeClairRyan (57) ABSTRACT

A vehicle jack locator system for a vehicle that incorporates a light source such as an LED to direct the operator to the recommended position for the load engaging saddle of a jack is disclosed. The vehicle jack locator system allows the operator to see, even in dark or poorly illuminated environments, the recommended place to position the jack saddle. The system incorporates a vehicle rocker panel having an outer surface and an underside positioned below the outer surface, a rocker panel jack attachment point on the underside of the panel for receiving the jack saddle, a jack placement indicator light positioned on the outer surface of the rocker panel at a point above the jack attachment point and near a tire, and a power system for selectively energizing the light. The power system is a tire pressure sensor system that includes tire pressure sensors and an electronic control module.

20 Claims, 5 Drawing Sheets

(56) References Cited

U.S. PATENT DOCUMENTS

2008/0298079 A1    12/2008   Whitehead
2014/0217342 A1     8/2014   Dondurur et al.
2015/0145668 A1     5/2015   Salter et al.
2016/0341407 A1    11/2016   Manfred

FOREIGN PATENT DOCUMENTS

JP       2000238518 A     9/2000
WO     2016198595 A1   12/2016

* cited by examiner

INDICATOR LIGHT TO CORRECTLY POSITION JACK UNDER VEHICLE IN AN UNLIGHTED ENVIRONMENT

TECHNICAL FIELD

The disclosed inventive concept relates generally to lifting devices for vehicles to facilitate tire changing. More particularly, the disclosed inventive concept relates to an indicator light fixed at a point on the vehicle just above the notch formed in the vertical rocker panel flange for receiving the load engaging saddle of the jack. The light enables the jack operator to easily and correctly locate the jack under the correct location of the vehicle in an unlighted or poorly lit environment for proper jack operation.

BACKGROUND OF THE INVENTION

The automobile is commonly fitted with a spare wheel that can function as a replacement for a road wheel that is no longer capable of functioning. A jack for lifting the vehicle, typically a scissors jack, is also provided with the vehicle to enable the vehicle operator to lift the vehicle to allow wheel replacement. While vehicle manufacturers endeavored to make the changing of a tire as easy as possible, it is understood that a significant percentage of vehicle operators do not know the steps required in changing a vehicle tire. According to a study undertaken by "Cheap Car Insurance" that investigated the comfort level of 2000 vehicle drivers in the U.S. with regard to their tire-changing knowledge, only 42.2% of drivers polled felt "completely confident" that they could change a flat tire, 17.0% claimed that they were "somewhat confident," 19.0% claimed that they were "not very confident" and a statistically significant 21.8% claimed that they were "clueless" as to how to change a tire. (http://www.cheapcarinsurance.net/americas-automotive-iq/)

Given numbers such as these, automobile manufacturers understand the need to continue to modify the tire changing-components, such as the vehicle jack, to simplify the operation for users. As to the jack itself, it is well-known that the vehicle is not lifted by any axle component but instead is lifted from a point under the vertical rocker panel. The correct location is either vehicle-forward near a front wheel or vehicle-rearward near a rear wheel.

Correct use of the scissors jack requires that the operator position the base or foot of the jack on the ground in a strategic location beneath a flange formed on the underside of the vertical rocker panel configured for this purpose. To enable the operator to readily and correctly position the load engaging saddle of the jack beneath the flange of the rocker panel, manufacturers typically provide markings such as arrows or notches in the flange to function as guide marks between which the saddle is to be positioned.

The system enabling the proper alignment of the load engaging saddle of the jack is effective under lighted conditions but is less effective under darkened or unlighted conditions. A jack operator finds that placing the jack in the correct position is made all the more difficult under such conditions and, of necessity, is forced to rely on a light source such as a flashlight or the illumination of a cell phone in order to properly align saddle of the jack with the placement markings on the rocker panel flange. This situation is made all the more complex because placement of the jack requires the operator to engage both hands, making them unavailable for handling the source. A further complexity is the likelihood that the operator's hands will have become dirty by handling the tire and tire-replacing tools, thus making them unsuitable for handling the flashlight or cell phone.

Accordingly, given the increased likelihood that the operator may fail to properly locate the jack in the event of a wheel replacement under conditions of limited or no ambient light, an alternative approach to jack alignment is needed. Such an improvement would provide a reduced risk that the operator would inadvertently position the jack in the wrong place, a circumstance that represents danger to the operator.

SUMMARY OF THE INVENTION

The disclosed inventive concept provides a vehicle jack locator system that incorporates a light source such as an LED having an arrow shape to direct the operator to the recommended position for the load engaging saddle of a jack. The disclosed system replaces or supplements current jack saddle position indictors. The jack placement indicator light may be activated either manually by the operator or may be activated automatically by a signal generated by the vehicle's tire pressure monitoring system (TPMS) when the vehicle has a flat tire. Some markets require TPMS like Europe (Regulation 661/2009) and the North American by the National Highway Traffic Safety Administration (NHTSA; FMVSS No. 138). Therefore, the vehicle jack locator system of the disclosed inventive concept can be implemented on every vehicle that has the TPMS.

The vehicle jack locator system of the disclosed inventive concept allows the operator to see, even in dark or poorly illuminated environments, the recommended place to position the saddle of the jack without the need of an extra power of light such as might be inconveniently provided by the operator's phone or a lantern. In addition, the vehicle jack locator system of the disclosed inventive concept is an intuitive indicator that provides help for those vehicle operators who are not aware of basic mechanics and only have an idea as to how to change a flat tire.

The vehicle jack locator system of the disclosed inventive concept incorporates a vehicle rocker panel having an outer surface and an underside positioned below the outer surface, a rocker panel jack attachment point on the underside of the rocker panel for receiving the load engaging saddle of a jack, a jack placement indicator light positioned on the outer surface of the rocker panel at a point above the rocker panel jack attachment point and near a tire, and a power system for selectively powering the indicator light. The power system is a tire pressure sensor system that includes tire pressure sensors and an electronic control module.

In use, the vehicle jack locator system includes a routine that continuously senses the tire pressure of each of the vehicle's tires through an associated tire pressure sensor. If the routine determines that a tire pressure is lower than an established value, the jack placement indicator light that is adjacent to that tire is illuminated for ease of jack placement identification by the operator. The light remains energized and glowing until the sensed tire pressure is equal to or above said established value as determined by the routine.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

The accompanying figures and the associated description illustrate a jack placement indicator light arrangement according to the inventive concept. The figures illustrate a certain vehicle having jack placement indicator lights of a given size and shape and placed in certain locations on the vehicle. However, it is to be understood that the shape, size and positions of the jack placement indicator light as shown in the figures are suggestive and are not intended as being limiting. For example, instead of arrow-shaped indicator lights, the indicator lights may be circular or elongated. In addition, instead of a single jack placement indicator light being shown in position above the vertical rocker panel flange for receiving the load engaging saddle of the jack, an additional indicator light may be spaced apart from the illustrated indicator, thus providing the operator with two indicators between which the load engaging saddle is to be placed. These changes may be made without deviating from either the spirit or the scope of the disclosed inventive concept.

Figure 1:
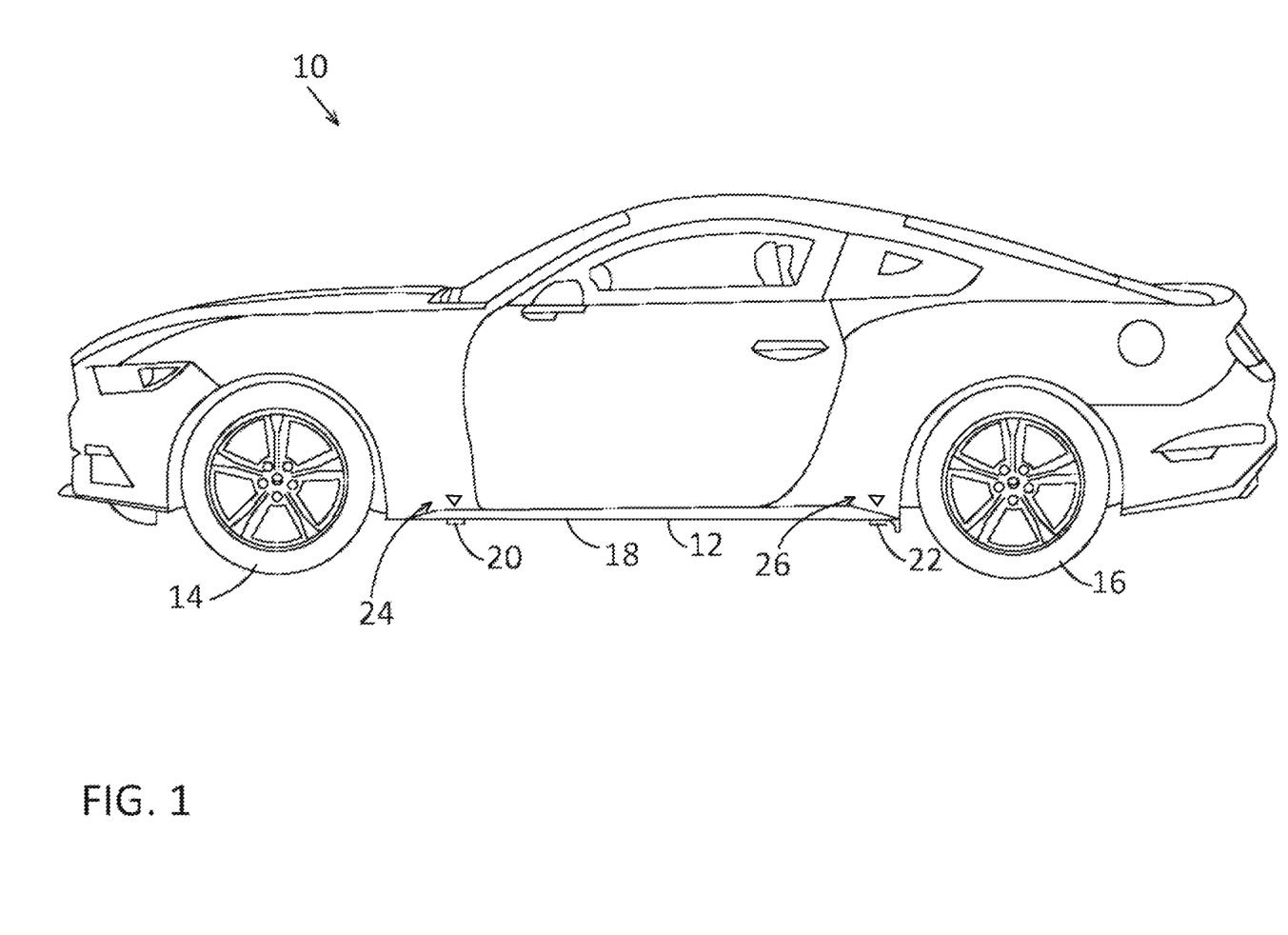
FIG. 1 is a side view of a vehicle bearing the jack placement indicator lights of the disclosed inventive concept in position along the vehicle rocker panel rearward of the front wheel and forward of the rear wheel.

Referring to FIG. 1, a vehicle is shown from its side. The vehicle, generally illustrated as 10, is illustrated as being an automobile, but it is to be understood that the disclosed inventive concept may find application as well on any other vehicle having tires that may need to be replaced upon failure, such as a truck. In addition, the disclosed inventive concept may also find application on a trailer.

The vehicle 10 includes an elongated rocker panel 12 positioned generally between a front wheel 14 and a rear wheel 16. The elongated rocker panel 12 includes an underside 18 having positioned thereon a front vertical rocker panel flange 20 for receiving the load engaging saddle of the jack and a rear vertical rocker panel flange 22 for receiving the load engaging saddle of the jack.

Positioned above the front vertical rocker panel flange 20 is a jack placement indicator light 24. Positioned above the rear vertical rocker panel flange 22 is a jack placement indicator light 26. As noted above, the shape, placement and number of the jack placement indicator lights may be varied from the shape, placement and number illustrated in FIG. 1.

Figure 2:
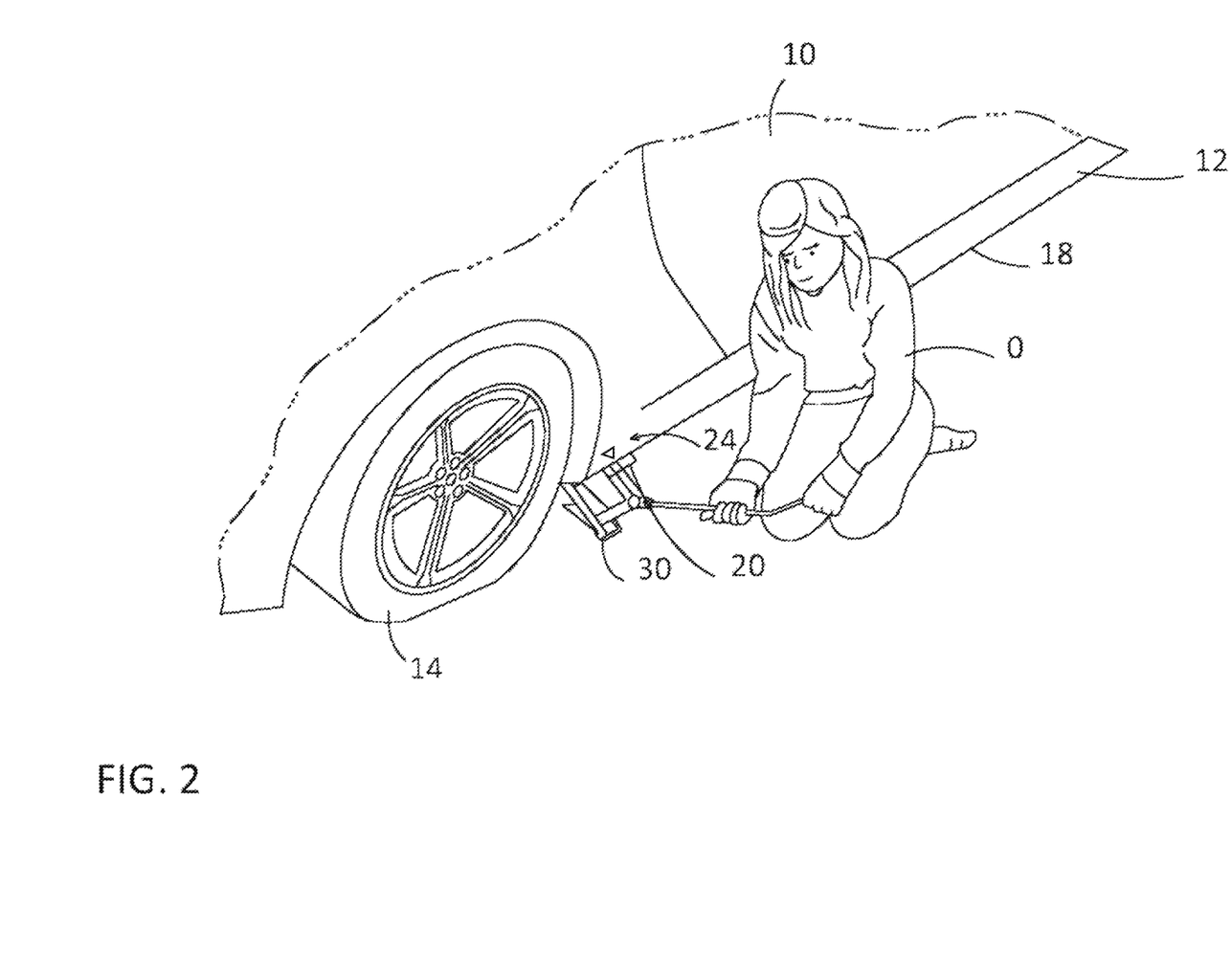
FIG. 2 is a perspective view illustrating an operator having placed a scissors jack in position beneath a jack placement indicator light.

The correct placement of a jack by a user is illustrated in FIG. 2 in which an operator "O" is illustrated adjacent the vehicle 10. In this instance the operator O is shown attending to the replacement of the front wheel 14 having a flat tire that is underinflated and that has an inflation tire pressure of less than the low pressure limit for the given type of tire. The operator O relies upon the jack placement indicator light 24 for correct placement of a scissors jack 30 under the front vertical rocker panel flange 20. Reliance on the front vertical rocker panel flange 20 by the operator O allows for correct placement of the scissors jack 30 relative to the front vertical rocker panel flange 20, thereby preventing misplacement of the scissors jack 30 and consequent injury to the operator O or to the vehicle 10.

Figure 3:
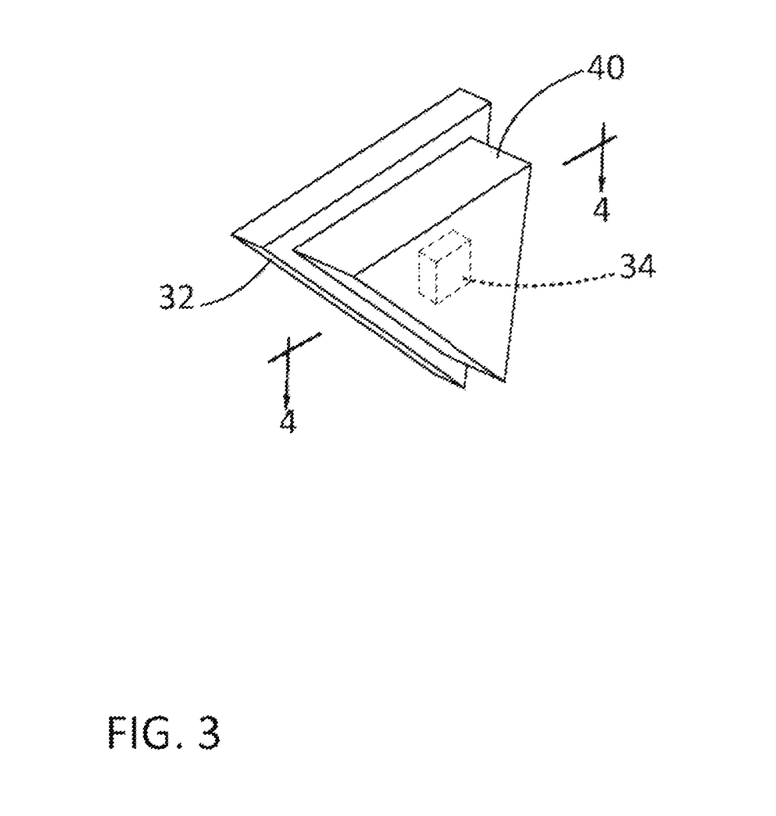
FIG. 3 is a perspective view of a jack placement indicator light according to the disclosed inventive concept.
Figure 4:
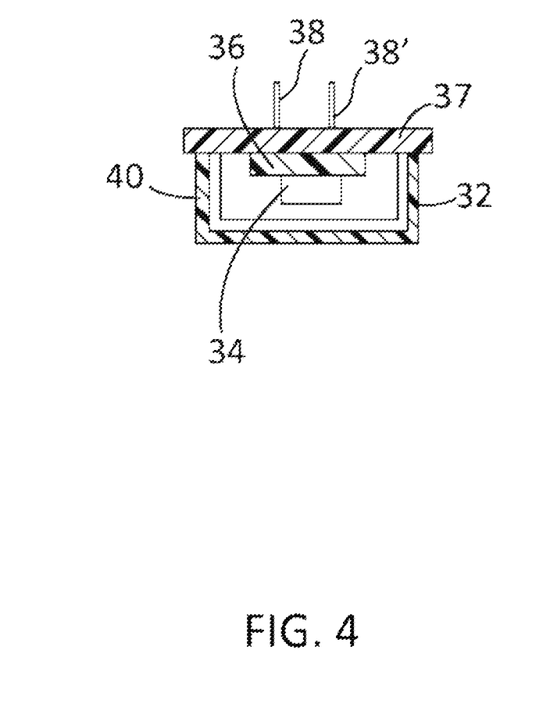
FIG. 4 is a cross-sectional view of the jack placement indicator light taken through line 4-4 of FIG. 3.

A preferred embodiment of the jack placement indicator light according to the disclosed inventive concept is illustrated in FIGS. 3 and 4 in which a jack placement indicator light 32 is illustrated. Referring to FIG. 3, the jack placement indicator light 32 is illustrated in perspective view. Referring to FIG. 4, the jack placement indicator light 32 is illustrated in sectional view taken along line 4-4 of FIG. 3.

Referring to both FIGS. 3 and 4, the jack placement indicator light 32 includes at least one light source 34. The light source 34 is preferably though not exclusively a light emitting diode (an LED), although another light source, such as an incandescent bulb, may be used. It is to be understood that while one light source 34 is illustrated, a plurality of light sources may be used. The light source 34 is mounted on a circuit board 36 attached to a light source base 37.

The jack placement indicator light 32 further includes electrical contacts 38 and 38' connected with the vehicle's electrical system (not shown) for receiving electrical power. For protection from debris and possible impact, the light source 34 includes a lens cover 40 formed from a rigid plastic that may be clear or may have an integral colorant such as, for example, a red color.

As noted above, the jack placement indicator light system of the disclosed inventive concept preferably but not absolutely operates in conjunction with the vehicle's tire pressure monitoring system (TPMS). The jack placement indicator light system, generally illustrated as 40, is diagrammatically illustrated in FIG. 5. The jack placement indicator light system 40 includes wheels 42, 42', 42", and 42'". Each of the wheels 42, 42', 42", and 42'" has associated therewith an air pressure sensor. Specifically, the wheel 42 has an associated air pressure sensor 44, the wheel 42' has an associated air pressure sensor 44', the wheel 42" has an associated air pressure sensor 44", and the wheel 42'" has an associated air pressure sensor 44'". Each of the air pressure sensors 44, 44', 44" and 44'" is operatively associated with an electronic control module (ECM) 46.

Figure 5:
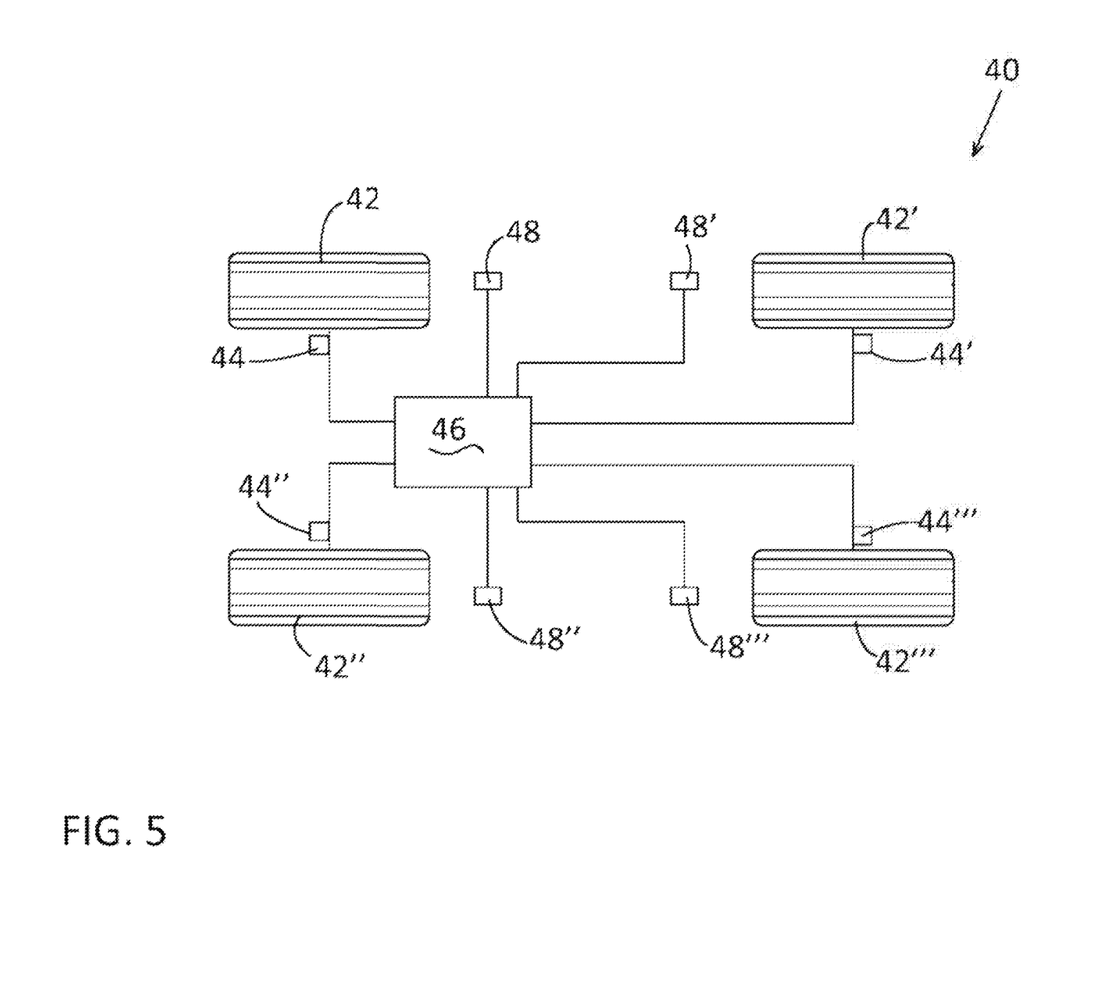
FIG. 5 is a diagrammatic illustration of the jack placement indicator lights relative to the tire pressure monitoring system of a vehicle according to the disclosed inventive concept.

Also operatively associated with the electronic control module 46 is a plurality of jack placement indicator lights. These include a jack placement indicator light 48, a jack placement indicator light 48', a jack placement indicator light 48", and a jack placement indicator light 48'".

The one or more indicator lights of the jack placement indicator light system 40 may be lighted by manual selection of the operator or may be engaged automatically when the system senses that a tire is below the minimum pressure level. For example, for wheel rotation or for a tire change under poorly lighted conditions no pressure drop would be sensed by the jack placement indicator light system 40. The operator would need to be able to manually engage the jack placement indicator light system 40 in such an event.

Figure 6:
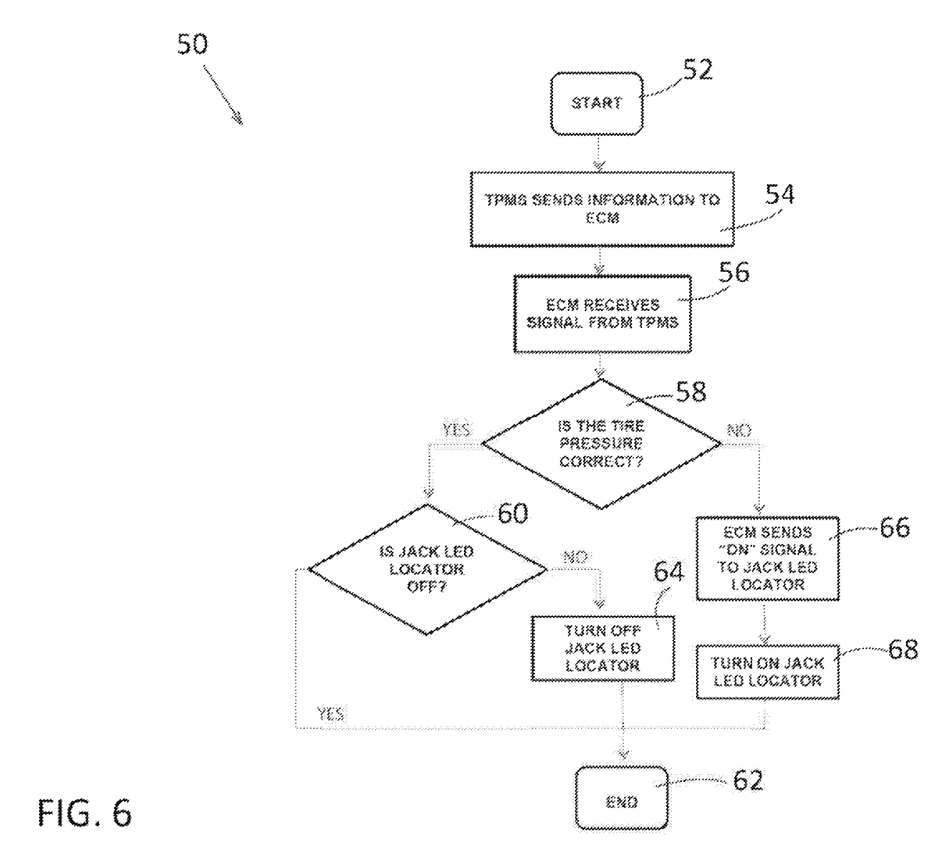
FIG. 6 is a flow diagram illustrating a routine for providing illuminated jack placement indicator lights.

However, it is more likely that the jack placement indicator light system 40 would be engaged in normal operation when a tire having low pressure is sensed and the operator would be required to change the tire. Referring to FIG. 6 (and with reliance on reference to certain components of FIG. 5), a jack placement indicator light system control routine according to a preferred but non-limiting embodiment, generally illustrated as 50, is shown. The routine 50 begins at start step 52 and continues to step 54 at which step the air pressure sensors 44, 44', 44" and 44'" of the tire pressure monitoring system (TPMS) detect the pressures of the tires respectively associated with the wheels 42, 42', 42", and 42'". At step 56, the electronic control module 46 receives the information regarding the tire pressure sent by one of the air pressure sensors 44, 44', 44" and 44'" of the tire pressure monitoring system (TPMS).

The correctness of the tire pressure sensed by one or more of the air pressure sensors 44, 44', 44" and 44'" is assessed by the electronic control unit 46 at step 58. If the sensed tire pressures are determined to be at the correct levels, then a determination as to the status of the jack placement indicator lights 48, 48', 48", and 48'" is made at step 60. If it is determined at step 60 that the jack placement indicator lights 48, 48', 48", and 48'" are off, the routine ends at step 62. However, if it is determined at step 60 that one or more of the jack placement indicator lights 48, 48', 48", and 48'" is on, then the light that is on is turned off at step 64 and the routine ends at step 62.

Conversely, if at step 58 it is determined that one of the tire pressures sensed by one of the air pressure sensors 44, 44', 44" or 44'" is below the threshold of the prescribed minimum tire pressure, then, at step 66, the electronic control module 46 sends an "on" signal to the relevant one of jack placement indicator lights 48, 48', 48", or 48'". At step 68 the relevant one of jack placement indicator lights 48, 48', 48", and 48'" is switched to its "on" position, thus enabling the operator to change the flat tire. The relevant jack placement indicator lights 48, 48', 48", or 48'" will remain "on" until either a timer (not shown) causes the light to turn off or the ignition switch (not shown) of the vehicle is re-engaged, thus causing the routine 50 to again start from step 52 in an effort to determine if all of the tire pressures are correct.

It is evident from the description provided above when read in conjunction with the attached FIGS. 1 through 6 that the jack placement indicator light system 40 of the disclosed inventive concept provides a great advantage to the vehicle operator in the event that a tire must be replaced in poorly lighted or completely dark ambient conditions. The jack placement indicator light system 40 disclosed herein thus provides a safe, reliable and cost-effective system for an operator to change a tire in low light conditions with minimum risk and maximum ease. The jack placement indicator system 40 disclosed herein may be easily incorporated into any vehicle having a tire pressure monitoring system. In addition, the jack placement indicator system 40 may be either included as part of the original vehicle upon manufacture or may be added to an existing vehicle having a tire pressure monitoring system. Furthermore, the jack placement indicator system 40 may be adapted for use with virtually any vehicle having pneumatic tires.

One skilled in the art will readily recognize from such discussion, and from the accompanying drawings and claims that various changes, modifications and variations can be made therein without departing from the true spirit and fair scope of the invention as defined by the following claims.

What is claimed is:

1. A jack locator system comprising:
    a vehicle rocker panel having an outer surface and an underside below said surface;
    a jack attachment point on said panel underside for receiving the load engaging saddle of a jack;
    a jack placement indicator light positioned on said panel outer surface at a location above said point, said light being arrow-shaped and pointing to said lack attachment point;
    a pressurized tire; and
    a tire pressure sensor associated with said light, whereby said sensor controls light illumination based on tire pressure, said light being illuminated when air pressure within said pressurized tire falls below an established threshold.

2. The vehicle jack locator system of claim 1, wherein said jack placement indicator light is one of a plurality of indicator lights and said pressurized tire is one of a plurality of tires, each of said tires having an adjacent indicator light.

3. The vehicle jack locator system of claim 1, further including a tire pressure management system that incorporates said tire pressure sensor, said tire pressure sensor being one of a plurality of tire pressure sensors.

4. The vehicle jack locator system of claim 3, wherein said tire pressure sensor system further includes an electronic control module to which each of said plurality of tire pressure sensors is operatively associated.

5. The vehicle jack locator system of claim 1, wherein said jack attachment point is defined by a vertical rocker panel flange.

6. The vehicle jack locator system of claim 1, wherein said jack placement indicator light includes a light source selected from the group consisting of a light emitting diode and an incandescent light.

7. The vehicle jack locator system of claim 6, wherein said jack placement indicator light includes a base attached to said outer surface of said rocker panel and a lens fitted to said base.

8. A vehicle jack locator system comprising:
    a vehicle rocker panel having an outer surface and an underside positioned below said outer surface;
    a rocker panel jack attachment point on said underside of said panel for receiving the load engaging saddle of a jack;
    a jack placement indicator light positioned on said outer surface of said panel at a location above said rocker panel jack attachment point, said light being arrow-shaped and pointing to said rocker panel jack attachment point; and
    a power system for selectively powering said light.

9. The vehicle jack locator system of claim 8, wherein said power system includes a tire pressure sensor system.

10. The vehicle jack locator system of claim 9, wherein said tire pressure sensor system includes tire pressure sensors.

11. The vehicle jack locator system of claim 10, wherein said tire pressure sensor system further includes an electronic control module to which said tire pressure sensors are operatively associated.

12. The vehicle jack locator system of claim 8, wherein said rocker panel jack attachment point is defined by a vertical rocker panel flange.

13. The vehicle jack locator system of claim 8, wherein said jack placement indicator light includes a light source selected from the group consisting of a light emitting diode and an incandescent light.

14. The vehicle jack locator system of claim 13, wherein said jack placement indicator light includes a base attached to said outer surface of said rocker panel and a lens fitted to said base.

15. A method of indicating the jack attachment point of a vehicle by illumination, the method comprising:
  forming a vehicle jack locator system including a vehicle rocker panel having an outer surface and an underside below said surface, a jack attachment point on said panel underside for receiving the load engaging saddle of a jack, a jack placement indicator light positioned on said panel outer surface at a location above said point, said light being arrow-shaped and pointing to said lack attachment point, a pressurized tire, and a tire pressure sensor associated with said light;
  causing said sensor to sense a tire pressure;
  determining if said sensed tire pressure is lower than an established value; and
  causing said light to be illuminated when said sensed tire pressure is lower than an established value thereby aiding an operator to correctly position a jack relative to said jack attachment point.

16. The method of indicating the jack attachment point of a vehicle of claim 15, including maintaining light illumination until the sensed tire pressure is equal to or above said established value.

17. The method of indicating the jack attachment point of a vehicle of claim 15, including forming a plurality of indicator lights, a plurality of sensors and a plurality of tires, each of said tires having a tire pressure sensor and an adjacent indicator light.

18. The method of indicating the jack attachment point of a vehicle of claim 17, including forming an electronic control module to which each of said lights and said sensors is operatively associated.

19. The method of indicating the jack attachment point of a vehicle of claim 15, further including forming vertical rocker panel flanges wherein each jack attachment point is defined by one of said vertical rocker panel flanges.

20. The method of indicating the jack attachment point of a vehicle of claim 15, wherein said jack placement indicator light includes a light source selected from the group consisting of a light emitting diode and an incandescent light.

* * * * *